Nov. 29, 1966  F. H. BUNGE ETAL  3,288,588
USE OF KILN GAS FOR PRODUCTION OF MAGNETIC IRON OXIDE
Filed Oct. 2, 1963  2 Sheets-Sheet 1
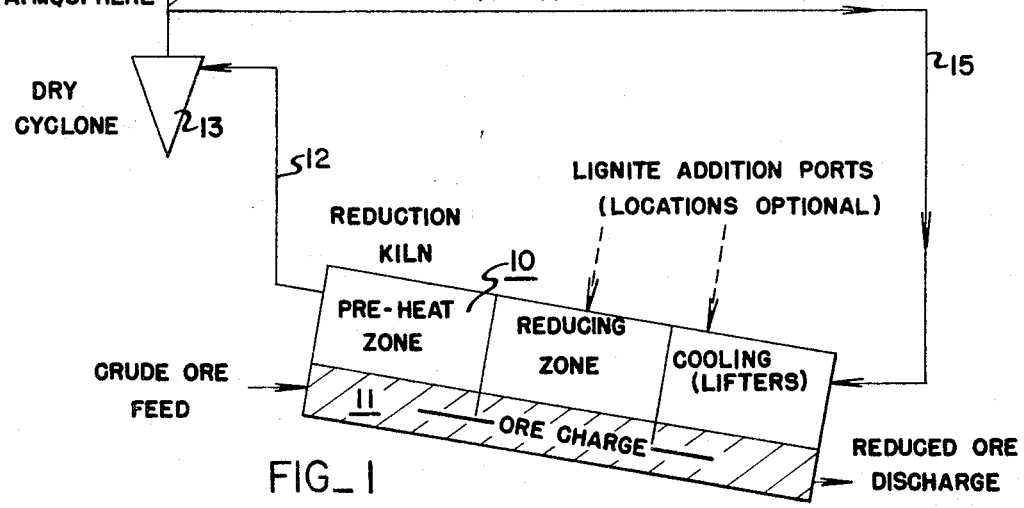
FIG_1
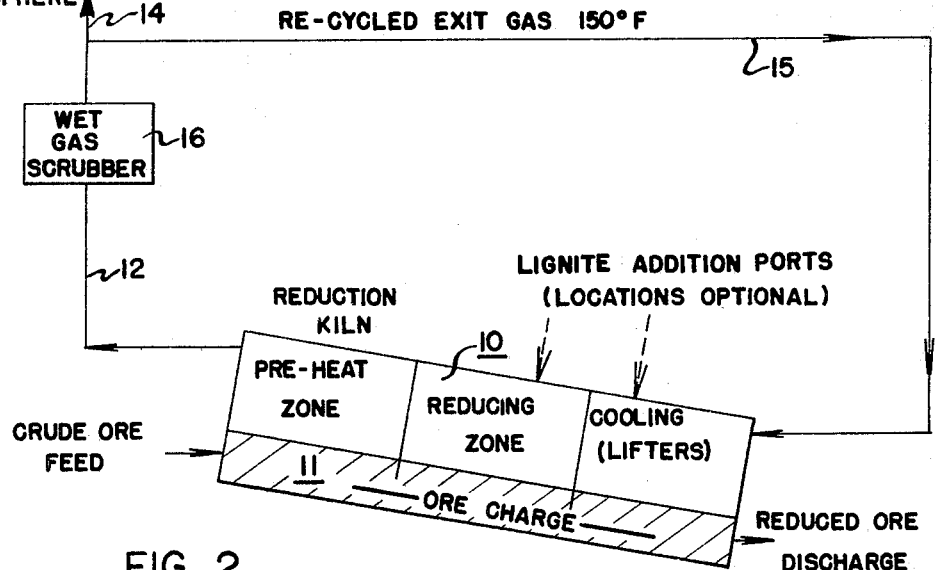
FIG_2
INVENTORS
FRED H. BUNGE &
HARRY H. VAUGHAN
BY
Oberlin, Maky & Donnelly
ATTORNEYS

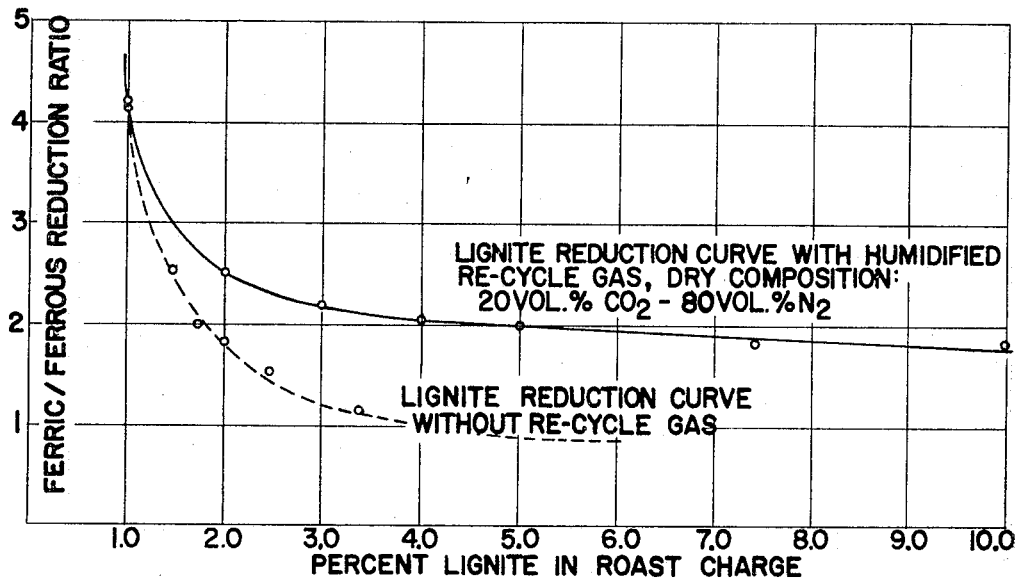
FIG_3
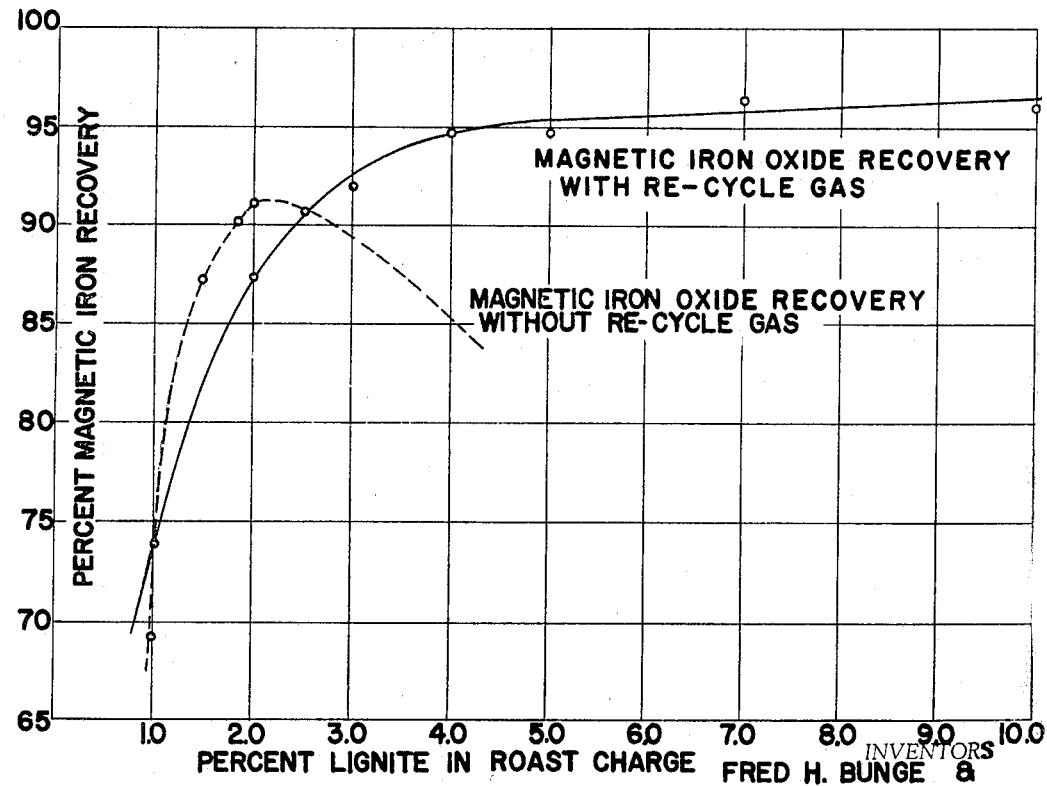
FIG_4

United States Patent Office 3,288,588
Patented Nov. 29, 1966

3,288,588
USE OF KILN GAS FOR PRODUCTION OF
MAGNETIC IRON OXIDE
Fred H. Bunge, Bay Village, Ohio, and Harry H. Vaughan, Hibbing, Minn., assignors to The Hanna Mining Company, Cleveland, Ohio, a corporation of Delaware
Filed Oct. 2, 1963, Ser. No. 313,353
6 Claims. (Cl. 75—1)

The present invention relates to the production of magnetic iron oxide and, more particularly, to the production of artificial magnetic iron oxide from naturally occurring ores, such as hematitic iron ores, by the use of a solid reductant, such as lignite, under equilibria heating or roasting conditions which provide an oxidation-reduction balance conducive to forming magnetic iron oxide, such as magnetite. Principally, the desired oxidation-reduction balance is obtained by controlling the $CO_2$ to $CO$ volume ratio in a otherwise substantially inert atmosphere and preferably controlling as well the $H_2O$ to $H_2$ volume ratio.

Iron ores have been chemically reduced in plants by the use of so-called gas producers. However, such equipment is costly and complicated and customarily requires auxiliary apparatus for the iron ore reduction plants. Moreover, prior art techniques of reduction have not embodied the maintenance of equilibria conditions as herein contemplated, especially in connection with recycling exit kiln gas.

It is, therefore, a principal object of the present invention to provide an improved technique for the reduction of iron ores and especially for the production therefrom of magnetic iron oxides.

Another object is to provide an atmosphere for chemically reducing naturally-occurring ore which provides an oxidation-reduction balance conducive to the formation of magnetite.

A futher object is to provide a method of producing magnetic iron oxide from non-magnetic naturally-occurring hematitic ore by roasting the ore in a semi-enclosure and in an atmosphere having a desired $CO_2$ to $CO$ volume ratio to maintain the magnetite phase of the hematitic iron ore converted to magnetic iron oxide.

A still further object is to provide a method of producing magnetic iron oxide from non-magnetic naturally-occurring ore by roasting the ore in a kiln and recycling the exit kiln gas back into the kiln to provide an atmosphere controlled as to the volume ratio of $CO_2$ to $CO$ preferably also of the volume ratio of $H_2O$ to $H_2$, thereby forming steady state equilibria conditions.

A futher object is to provide such a method involving as well the use of a solid reductant.

Other objects will become apparent at the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawing:

FIGURE 1 is a diagrammatic longitudinal section of a rotary kiln and illustrates one manner in which the invention may be practiced;

FIGURE 2 is a longitudinal section similar to FIGURE 1 and shows a modified treatment for the kiln exit gas prior to recycling;

FIGURE 3 is a graph illustrating the effect of recycle gas on the ferric to ferrous reduction ratio for varying amounts of solid reductant added;

FIGURE 4 is a graph illustrating the effect of recycle gas on recovery of magnetic iron oxide for similarly varying additions of a solid reductant.

In accordance with the present invention, magnetic iron oxide is obtained by roasting a non-magnetic iron ore in the presence of a carbonaceous solid reductant effective at the temperature of roasting to convert the ore to a magnetic form, and effecting such roasting in a chemically equilibrated atmosphere conducive to the formation of magnetite, that is, an atmosphere conducive to maintaining the magnetite phase of the iron ore converted to magnetic iron oxide. In general such an atmosphere is generated by providing an environment having a desired $CO_2$ to $CO$ volume ratio and preferably as well a desired $H_2O$ to $H_2$ ratio. This is readily realized in the preferred practice of the invention by recycling the exit gas of a kiln wherein the roasting of the ore is already taking place back into the kiln in such a manner that the desired ratio or ratios are maintained.

Non-magnetic naturally occurring iron ores in general may be used, the form most often employed being the widely distributed hematitic iron ores. The role of the carbonaceous solid reductant is to effect the chemical reduction of the ore at the roasting temperatures. This component decomposes at such temperatures to release reductants which efficiently act to create chemically magnetic iron oxide such as magnetite.

For this purpose soft coal and actually a low rank coal are suitable. By a "low rank" coal is meant one having a relatively low B.t.u value which is a measure of the carbon content. For purposes of this disclosure, a low rank coal may be considered to be one having less than 9,000 B.t.u.'s per pound, although this value is not to be taken as critical to the invention. One grade of lignite used had a value of approximately 7200 B.t.u.'s per pound on a natural basis (35 percent moisture), and a value of about 11,000 B.t.u.'s per pound on a dry basis. As indicated, the best solid reductants are those coal products which are intermediate the metamorphism of peat to bituminous coal. These materials are represented by brown coal, notably lignite and also jet, the latter being a relatively dense lignite.

In carrying out the invention, the ore is preferably cruhed and then admixed with the solid reductant also in particulate form. The relative sizes are not at all critical, the objective being rather the realization of a substantially uniform intimate mix. The solid reductant constitutes a minor amount of the admixture and ordinarily may range from abou 0.5 percent to about 10 percent by weight of the admixture.

Roasting to the admixture occurs at elevated temperatures effective to decompose the solid reductant and extends for a period of time sufficient to effect the desired reduction of the ore. For example, the heating may take place at a temperature within the range of about 500° C. to about 1000° C. and for a period of time of about 15 minutes to about 4 hours. It is much preferred to conduct the heating in an atmosphere inert to the admixture and particularly the solid reductant to facilitate the desired reactions.

The concept per se of roasting an ore in the presence of a solid reductant is disclosed and claimed in application Serial No. 313,373, filed October 2, 1963, in the names of Bunge, Vaughan, and Morrow. In geenral, the present invention provides preferably in addition to the use of the solid reductant, a chemically equilibrated atmosphere for the roasting or heating step which favors the formation of magnetite. As a result, such an atmosphere provides a desired oxidation-reduction balance which, as indicated, is conducive to the formation and controlled maintenance of magnetite and, more particularly, is conducive to maintaining the magnetite phase of hematitic iron ore converted to magnetic iron oxide.

This is accomplished in accordance with the present invention by providing a non-oxidizing atmosphere for the roasting or heating step having a desired $CO_2$ to CO volume ratio and preferably as well a desired $H_2O$ to $H_2$ volume ratio, such as atmosphere engendering the desired state equilibria conditions. As hematite is progressively reduced, it passes from $Fe_2O_3$ to $Fe_3O_4$ to FeO to Fe (metallic iron) or, alternatively from $Fe_2O_3$ to $Fe_3O_4$ to Fe (metallic iron). In reduction roasting to artificial magnetic iron oxide, it is desired to control and confine the reduction to the $Fe_3O_4$ phase. This control can be achieved by proper adjustment of the concentration of critical reducing gas components.

In accordance with the present invention, the oxidation-reduction conditions of the roasting atmosphere are controlled to enhance the production of the magnetic oxide. More particularly, the roasting atmosphere while otherwise inert to the ore mixture being treated should contain a reducing quantity of CO with respect to $CO_2$. Similarly, the reductive power of $H_2$ with respect to $H_2O$ aids in realizing proper equilibria conditions for creation and retention of magnetite, $Fe_3O_4$.

As an index to the relative oxidizing or reducing power of an atmosphere, volume ratios of $CO_2$ to CO and $H_2O$ to $H_2$ may be used. From limiting equilibria conditions under which Fe and FeO change to $Fe_3O_4$, there is a vast range of changing ratios before those equilibria conditions are reached under which $Fe_3O_4$ changes to $Fe_2O_3$. For purposes of calculating volume ratios, the volumes of $CO_2$, CO, and $H_2$ are reckoned at standard conditions, while the volume of $H_2O$ is reckoned at 350° F. and atmospheric pressure.

Considering that area of the equilibrium system where Fe and/or FeO changes to $Fe_3O_4$, as the temperature varies from about 300° F. to about 1700° F., a ratio of $CO_2/CO$ of at least 2 to 3 (over that temperature range) is needed to maintain the magnetite ($Fe_3O_4$) phase. On the other hand, considering that area of the equilibrium system where $Fe_3O_4$ changes to $Fe_2O_3$, the $CO_2/CO$ ratio should not exceed 600,000 to 10,000 (an increasing temperature lowers the permissible maximum ratio) as the temperature rises over the same temperature range.

Comparative data for the $H_2O/H_2$ ratio are: considering that area of the equilibrium system where Fe and/or FeO changes to $Fe_3O_4$, as the temperature varies from about 300° F. to about 1700° F., a ratio of at least 0.01 to 4 (over that temperature range) is needed to maintain the magnetite phase. On the other hand, considering that area of the equilibrium system where $Fe_3O_4$ changes to $Fe_2O_3$, the $H_2O/H_2$ ratio should not exceed 1,000 to 15,000 as the temperature rises over the same temperature range.

For usual operating conditions in a conventional kiln in which roasting temperatures may vary from about 700° F. to about 1600° F., the magnetite phase is favored as herein contemplated when the $CO_2/CO$ ratio varies from a minimum of about 2 to 2.5 (where Fe and FeO convert to $Fe_3O_4$) to a maximum of about 14,500 to 10,000 (where $Fe_3O_4$ converts to $Fe_2O_3$) as the temperature rises within such range, (noting again that an increasing temperature for this couplet lowers the permissible maximum ratio). Similarly, the magnetite phase is favored as herein contemplated when the $H_2O/H_2$ ratio varies from a minimum of about 0.06 to about 4 to a maximum of about 1,350 to about 11,000 as the temperature rises within such temperature range. In general, ratios for each couplet ranging from about 10 to about 10,000 cover most of the commercially practical operating conditions.

The balance of the roasting atmosphere should be inert to the ore being treated and normally consists essentially of nitrogen gas, although minor percentages of other typical inert gaseous combustion residues may also be present. The entire operation is preferably carried out in a semi-enclosure such as a kiln, preferably of rotary design. To achieve the desired defined atmosphere, the gases may be created naturally over the ore being roasted, or the gases may be added thereabout or conversely removed therefrom, either alteration being effected in controlled amounts as may be desired.

In the preferred practice of the invention, the exis gas of a kiln in which the roasting operation is conducted and which is normally high in carbon dioxide gas may be recycled back into the kiln to achieve the controlled atmosphere described. The exit kiln gas may be heated prior to recycling such as to a temperature within the range of about 100° F. to about 500° F. and preferably to about 300° F. to 350° F. Other changes in composition of the gases so recycled may be made as are necessary to obtain desired ratios of the defined couplets and thereby provide the proper equilibria conditions within the kiln.

For instance, one may premix the solid reductant with the ore charge and then introduce the mixed charge into a semi-inclosure such as an externally heated, horizontally-extending rotating drum. An atmosphere may be generated over the charge containing the gases in the defined ratios by combustion of the reductant and other combustibles. If desired or necessary, the gaseous content of such an atmosphere may be adjusted by adding or withdrawing that gas needing adjustment.

On a large scale application, such as in a rotary kiln, the solid reductant such as lignite may be added directly into the kiln at some convenient location intermediate the ends thereof. For example, the solid reductant in particulate form may be added through diametral orifices at predetermined points along the longitudinal axis of the kiln. The natural rolling action of the kiln as it rotates may be used to intermix the ore and solid reductant, or if desired lifters may be mounted along the interior walls of the kiln for this purpose. Simultaneously, the exit gas discharged from the kiln may be recycled, as indicated, and forced back into the kiln, any auxiliary treatment such as scrubbing of the exit gas being carried out prior to actual entry into the kiln of the recycled gases. Since the solid reductant alone does not necessarily supply the desired equilibrium roasting atmosphere, this injection of a gas having a desired composition artificially creates the necessary oxidation-reduction balance and thereby enables better control of the roast calcine composition as magnetite. The amount of such an injection gas can be controlled in accordance with the concept of the present invention to permit formation of the desired magnetite within conditions defined by the iron reduction phase diagrams for various roasting atmospheres. It is emphasized that the recycling of the exit gas, as back through a kiln, also enables recovery of sensible heat in such gas. The recovered heat is an important economic advantage, for example, by serving to preheat the ore.

It has been discovered as desirable by means of the present invention to control the extent of reduction of the ore so that the reduction ratio, expressed here and in the claims as a ratio of ferric iron to ferrous iron in the reduced ore, is within the range of about 1.5 to about 2.5 and is preferably 2. Ratios within this range achieve an enhanced conversion of the ore with respect to good magnetic concentration characteristics.

Referring to FIGURE 1, a conventional rotary kiln, diagrammatically indicated at 10, receives an ore charge 11 which passes through three arbitrarily indicated zones wherein the ore is sequentially preheated and then chemically reduced. A solid reductant such as lignite is introduced into what is here designated as the last two zones through suitable openings in the peripheral wall of the kiln 10. The physical location of such openings is optional and need not necessarily be limited to the location indicated in FIGURES 1 and 2. As indicated, lifters along the internal wall of the exit end of the kiln 10 may be used to ensure adequate mixing of the ore and reductant. Kiln gas exits at that end which receives the ore charge 11 and passes through line 12 to a standard dust cyclone 13. The effluent from the cyclone passes to the atmosphere through line 14, but some effluent recycles back through line 15 into the kiln 10 through the end discharging the chemically reduced ore. This technique enables the recycling of a hot gas heating the desired composition throughout the entire length of the kiln 10 and maintatins a steady state equilibrium atmosphere which can be controlled to favor equilibrium formation of magnetite.

FIGURE 2 is similar to FIGURE 1 and therefore like numbers are used to indicate like parts. In addition, FIGURE 2 illustrates an alternative arrangement in which the kiln exit gas is recycled back to the kiln from a wet gas scrubber 16, a typical temperature of such a scrubbed recycled gas being approximately 150° F. The scrubber 16 removes fines and also water in the gas. Thus, the use of the scrubber is one specific way of adjusting the water content of the recycled gas. Conventional analyses, such as Orsat analysis, of such gas readily indicates if adjustment in the $CO_2$, CO, or $H_2$ content is necessary.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

EXAMPLES 1 THROUGH 6

Various tests were conducted at such high temperature roasts as 675° C. and 800° C., using lignite additions of 0.99 to 4.76 percent by weight. The lignite used in these investigations had the following analyses:

|  | Percent |
|---|---|
| Moisture | 5.96 |
| Volatile matter | 46.24 |
| Fixed carbon | 30.04 |
| Ash | 17.76 |

The following Table A shows the results for roasting a typical Mesabi Range low grade hematitic iron ore with various percentages of lignite added:

EXAMPLES 7 THROUGH 19

It will be noted from Table A that by controlling the temperature of the roast and/or the lignite concentration, it is possible to control closely the degree of reduction, expressed as the defined ferric to ferrous ratio, and achieve optimum magnetic performance for the roast calcine as described and claimed in application Serial No. 313,373, previously referred to. The use of a control as contemplated by the present invention is illustrated by Table B where for varying lignite concentrations, Examples 7 through 12 exemplify roasts carried out under an atmosphere of inert nitrogen, and Examples 8 through 19 exemplify roasts carried out under a humidified atmosphere of $CO_2$, CO, $H_2$, and $N_2$. The manner of humidifying and content of the recycled gas per se are described in footnotes to the table. The $CO_2$/CO and $H_2O/H_2$ ratios of Examples 13, 14, 16, and 18 also fell well within the magnetite phase of the iron oxidation-reduction equilibrium diagrams.

The graphs of FIGURES 3 and 4 are based on the data of Table B. FIGURE 3 illustrates how quickly the ferric to ferrous reduction ratio decreases as the percent of lignite in the roast charge increases. The dotted curve, which represents lignite reduction without recycle gas, descends smoothly from a ferric to ferrous ratio of 4.20 to a value of 1.15. The lower value of 1.15 is not, however, the minimum ratio value possible since additional lignite would give even lower ratios. Reduction without restraints, such as without recycle gas, proceeds smoothly and steadily toward formation of undesirable lower oxides and metallic iron as a function of the amount of lignite present. However, the solid curve, which represents lignite reduction with a humidified recycled gas constituted to maintain within the kiln desired $CO_2$/CO and $H_2O/H_2$ ratios, decreases initially only to level off at the preferred ferric to ferrous ratio of 2. The graph of FIGURE 3 shows that a control of the reduction ratio is possible with a humidified recycle gas even at very excessive concentrations of lignite.

In this regard, it will be noted that recycled exit gas permits the use of larger quantities of lignite addition with good reduction equilibrium control for magnetite formation than when exit gas is not recycled. The excess fuel not used for magnetite formation is burned in the heating zone to preheat the ore to the temperature required for reduction of the non-magnetic iron to mag-

*Table A*

| Example | Weight Percent Lignite | Roast Temp., ° C. | Roast Time (min.) | Reduction Ratio (ferric/ferrous) | Calcine Total Carbon, Percent | −325 Mesh Magnetic Concentrates ||||
|---|---|---|---|---|---|---|---|---|---|
| | | | | | | Percent Weight | Percent Fe | Percent $SiO_2$ | Percent Fe Rec. |
| 1 | .99 | 675 | 90 | 4.48 | .32 | 41.67 | 66.99 | 5.44 | 68.80 |
| 2 | .99 | 800 | 90 | 3.04 | .14 | 48.70 | 66.50 | 6.15 | 81.11 |
| 3 | 1.96 | 675 | 90 | 2.40 | .55 | 55.70 | 66.54 | 6.02 | 89.18 |
| 4 | 1.96 | 800 | 90 | 1.81 | .16 | 53.85 | 68.16 | 5.19 | 90.44 |
| 5 | 4.76 | 675 | 180 | 1.12 | 1.16 | 51.27 | 69.41 | 4.57 | 88.58 |
| 6 | 4.76 | 800 | 180 | .19 | .20 | 1.28 | 69.62 | | |

In the portion of Table A entitled "−325 Mesh Magnetic Concentrates," as well as in the similarly labeled column of Table B, the data were obtained by first grinding the roasted calcine to pass a 325 mesh, U.S. Standard Sieve, and then moving the ground calcine through a Davis Tube to collect the magnetic portion in a manner known in the art. The first column of the indicated portion of Table A gives the percent by weight of the magnetic portion of the calcine; and the second and third columns provide the percentage of iron and silica in such magnetic portion. The last column provides the percent of the magnetic iron realized compared to all the iron present in the calcine.

netite with the solid fuel reductant. Lower magnetic roasting costs may be realized in some geographical areas if the reduction system has the ability to utilize solid fuel for preheating the ore in addition to its use as a reductant.

The graph of FIGURE 4 is even more impressive. The dotted curve based on data obtained without recycled gas shows a maximum recovery of magnetic iron at about 2 percent lignite, the percent recovery dropping off rapidly as lesser or greater amounts of lignite are used. However, with use of recycled gas as defined, the amount of magnetic iron recovered ever increases as the amount of lignite employed likewise increases within the limitation of the data observed.

Table B

| Example | Roast Cycle, Minutes | | | Lignite added, as Percent of Crude | Roasting Gas Comp., Vol. Percent and Ratios | | | | |
|---|---|---|---|---|---|---|---|---|---|
| | Pre-Heat | 800° C. Soak | Cool to 371° C. | | $CO_2$ | $N_2$ | $H_2O$ | $CO_2/CO$ | $H_2O/H_2$ |
| 7 | :12 | :15 | (¹) | 1.0 | 0 | 100 | 0 | | |
| 8 | :15 | :15 | (¹) | 1.5 | 0 | 100 | 0 | | |
| 9 | :16 | :15 | (¹) | 1.75 | 0 | 100 | 0 | | |
| 10 | :20 | :15 | (¹) | 2.00 | 0 | 100 | 0 | | |
| 11 | :12 | :15 | (¹) | 2.5 | 0 | 100 | 0 | | |
| 12 | :14 | :15 | (¹) | 3.5 | 0 | 100 | 0 | | |
| 13 | :24 | :15 | :07 | 1.0 | 20 | 80 | (²) | | |
| 14 | :19 | :15 | :07 | 2.0 | 20 | 80 | (²) | | |
| 15 | :19 | :15 | :08 | 3.0 | 20 | 80 | (²) | 23 | 244 |
| 16 | :19 | :15 | :07 | 4.0 | 20 | 80 | (²) | | |
| 17 | :17 | :15 | :07½ | 5.0 | 20 | 80 | (²) | | 81 |
| 18 | :19 | :15 | :08 | 7.5 | 20 | 80 | (²) | | |
| 19 | :19 | :15 | :08 | 10.0 | 20 | 80 | (²) | 23 | 27.1 |

| Example | Calcine ᵃ | | | | | —325M Davis Tube Conc's. | | | |
|---|---|---|---|---|---|---|---|---|---|
| | LOI | Percent Tot. Fe | Percent Fe | Redn. Ratio | Percent Tot. C | Calcine, Wt. Percent | Percent Tot. Fe | Percent $SiO_2$ | Percent Fe Dist. |
| 7 | 8.58 | 44.47 | 8.55 | 4.20 | | 44.81 | 67.12 | 4.78 | 69.10 |
| 8 | 9.03 | 45.11 | 13.00 | 2.47 | | 58.59 | 67.51 | 5.41 | 87.89 |
| 9 | 10.24 | 45.65 | 15.19 | 2.01 | | 60.80 | 67.84 | 5.56 | 90.34 |
| 10 | 8.82 | 43.82 | 16.05 | 1.73 | | 59.45 | 68.31 | 5.34 | 91.51 |
| 11 | 10.89 | 44.23 | 16.95 | 1.61 | | 59.34 | 67.76 | 5.29 | 91.16 |
| 12 | 12.40 | 45.12 | 20.98 | 1.15 | | 56.78 | 69.19 | 4.56 | 87.60 |
| 13 | 14.85 | 45.27 | 8.76 | 4.17 | .07 | 50.38 | 66.24 | 5.96 | 73.76 |
| 14 | 16.67 | 43.88 | 12.54 | 2.50 | .09 | 58.15 | 66.60 | 6.35 | 87.96 |
| 15 | 18.77 | 46.00 | 14.15 | 2.25 | .08 | 63.64 | 66.40 | 6.65 | 91.71 |
| 16 | 18.27 | 44.69 | 14.54 | 2.07 | .08 | 64.66 | 65.97 | 7.32 | 94.84 |
| 17 | 19.68 | 45.09 | 14.79 | 2.02 | .03 | 66.33 | 65.77 | 7.60 | 94.85 |
| 18 | 20.41 | 45.09 | 15.99 | 1.82 | .10 | 66.25 | 66.60 | 7.10 | 96.67 |
| 19 | 23.64 | 46.13 | 16.24 | 1.84 | .04 | 68.02 | 66.16 | 7.61 | 96.59 |

¹ Calcines from this set were cooled to ambient temperature in a continual flow of inert nitrogen.
² Calcines from this set were cooled with a humidified re-cycle gas from 800° C. (1,472° F.) to 371° C. (700° F.), then directly water quenched. The simulated re-cyle gas of 20/80:$CO_2$/$N_2$ volume percent was humidified by vaporizing 4.21 cc. liquid water per minute into the dry gas stream flowing at 11.42 liters/minute. This humidified re-cycle atmosphere was then heated to 350° F. and injected into the roasting system throughout the entire roasting and cooling cycle. Such a recycle gas gives a computed volume percent analysis as follows: $CO_2$=13.30; $N_2$=53.33; Water vapor=33.37. This is apart from CO and $H_2$ already in the kiln.
ᵃ Crude ore used in these roasts consisted of —⅜ inch Patrick C "C" material, kiln feed composite assaying 41.83% iron.
LOI means "loss on ignition."

Other forms embodying the features of the invention may be employed, change being made as regards the features herein disclosed, provided those stated by any of the following claims or the equivalent of such features be employed.

We therefore particularly point out and distinctly claim as our invention:

1. In a method of forming magnetic iron oxide from non-magnetic iron ore in which an admixture of such an ore and a solid carbonaceous reducing agent is heated, the improvement comprising roasting such an admixture at a temperature within the range of about 700° F. to about 1700° F. for about 15 minutes to about four hours in a heating apparatus to convert such ore into a magnetic form, removing the exit gas from such heating apparatus, recycling such gas to the heating apparatus in a sufficient quantity to control the composition of such heating atmosphere to proide a $CO_2$ to CO volume ratio of about 2 to about 10,000 and an $H_2O$ and $H_2$ volume ratio of about 0.06 to about 11,000, and controlling the temperature of such recycled gas to maintain such gas at a temperature within the range of approximately 100° F. to about 500° F. to assist in providing the desired $CO_2$ to CO and $H_2O$ to $H_2$ volume ratio therein.

2. The method of claim 1 in which such recycled gas is passed countercurrently to such admixture within such heating apparatus to assist in maintaining the composition of such heating atmosphere throughout such heating apparatus.

3. The method of claim 1 in which such recycled gas is heated to a temperature of approximately 300 to 350° F.

4. The method of claim 1 in which such carbonaceous reducing agent is added directly to such heating apparatus intermediate the passage of such admixture therethrough.

5. The method of claim 1 further including the step of controlling the amount of water in the recycled gas and therefore the $H_2O$ to $H_2$ volume ratio in said gas by passing it through a water scrubber.

6. The method of claim 1 further including the steps of recovering the sensible heat from the roasted admixture by the exit gas recycled back into the kiln, and using such recovered sensible heat in the defined roasting operation.

References Cited by the Examiner

UNITED STATES PATENTS

| | | | |
|---|---|---|---|
| 1,588,420 | 6/1926 | Hindshaw | 75—1 |
| 2,269,465 | 1/1942 | Lykken | 75—1 |
| 2,528,552 | 11/1950 | Royster | 75—1 |
| 2,961,411 | 11/1960 | Klugh | 75—4 |
| 3,093,474 | 6/1963 | Collin | 75—33 |
| 3,128,173 | 4/1964 | Gresham | 75—1 |

BENJAMIN HENKIN, *Primary Examiner.*

DAVID L. RECK, *Examiner.*